United States Patent
Berding et al.

[15] 3,668,246
[45] June 6, 1972

[54] PROCESS FOR THE CONTINUOUS PRODUCTION OF ALKALI METAL SALTS OF NITRILOTRIACETIC ACID

[72] Inventors: Christoph Berding, Limburgerhof, Upper Palatinate; Paul Guenthert, Iggelheim, Upper Palatinate, Waldemar Koehler; Gerhard Schulz, both of Ludwigshafen, Rhineland, all of Germany

[73] Assignee: Badische Anilin-& Soda-Fabrik Aktiengesellschaft, Ludwigshafen, am Rhine, Germany

[22] Filed: Aug. 12, 1968

[21] Appl. No.: 752,033

[30] Foreign Application Priority Data

Aug. 16, 1967 Germany ............. P 16 43 238.5

[52] U.S. Cl. .................................................. 260/534 E
[51] Int. Cl. .................................................. C07c 101/20
[58] Field of Search ...................................... 260/534 E

[56] References Cited

UNITED STATES PATENTS

| | | | |
|---|---|---|---|
| 3,419,609 | 12/1968 | Sibert | 260/534 E |
| 2,860,164 | 11/1958 | Kroll et al. | 260/534 E |
| 2,631,165 | 3/1953 | Ploetz | 260/534 E |
| 2,500,019 | 3/1950 | Bersworth | 260/534 E |
| 2,407,645 | 9/1945 | Bersworth | 260/534 E |

Primary Examiner—Lorraine A. Weinberger
Assistant Examiner—John F. Terapane
Attorney—Marzall, Johnston, Cook & Root

[57] ABSTRACT

Continuous production of alkali metal salts of nitrilotriacetic acid from an alkali metal cyanide, formaldehyde and ammonia by reaction of the components in at least two stages, the alkali metal cyanide being reacted with formaldehyde in stoichiometric or substantially stoichiometric ratio at temperatures of 50° to 200° and pressures of from atmospheric pressure to 50 atmospheres gauge in the presence of an excess of ammonia in the first stage and (while simultaneously removing ammonia) further amounts of alkali metal cyanide and formaldehyde being allowed to act at temperatures of 60° to 110°C in one or more subsequent stages, 5 to 35 mole percent of the total amount of alkali metal cyanide required being replaced by free hydrocyanic acid and/or hydroxyacetonitrile.

6 Claims, 2 Drawing Figures

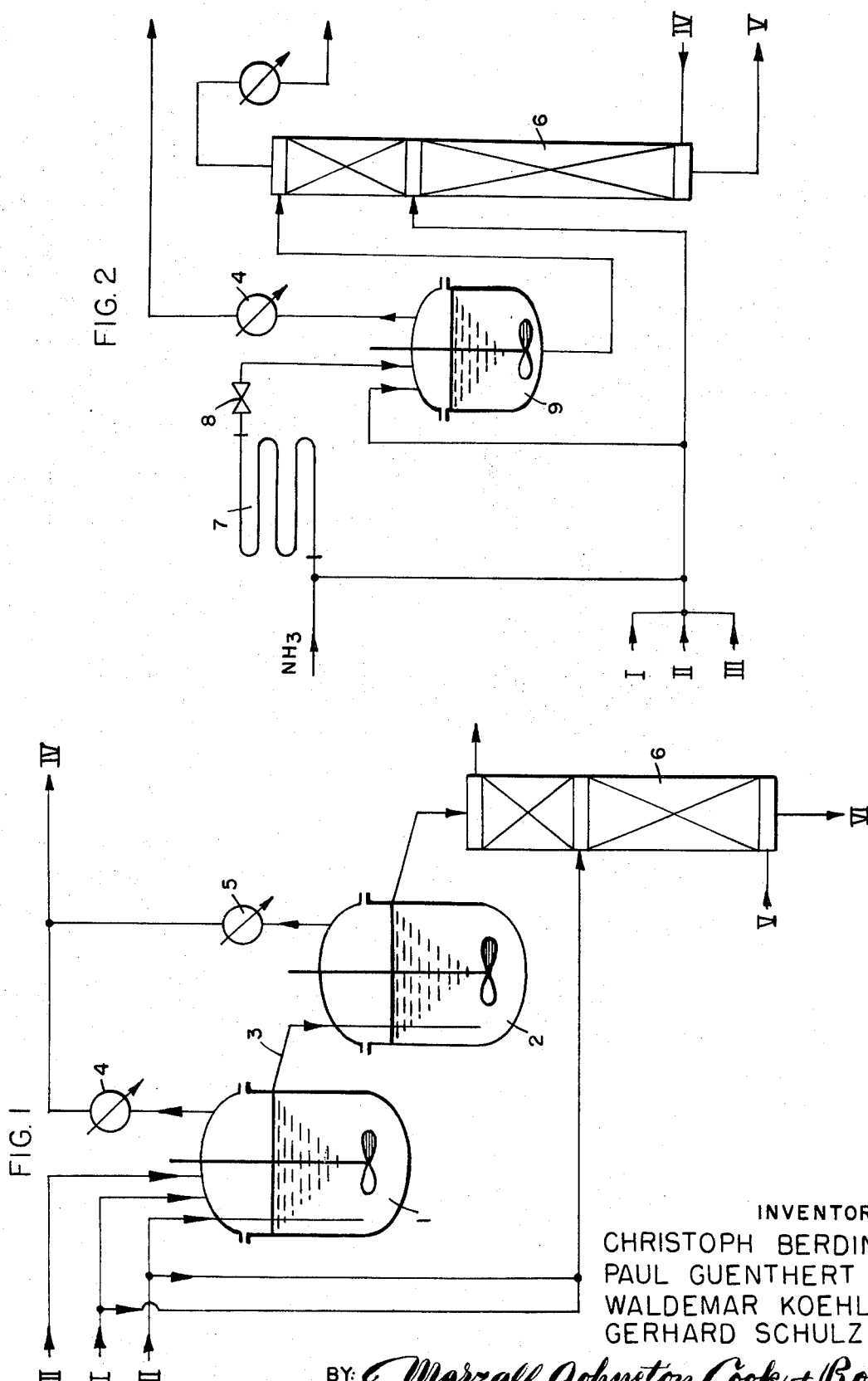

PROCESS FOR THE CONTINUOUS PRODUCTION OF ALKALI METAL SALTS OF NITRILOTRIACETIC ACID

The present invention relates to a new continuous process for the production of alkali metal salts of nitrilotriacetic acid from alkali metal cyanides, formaldehyde and ammonia.

It is known that alkali metal salts of nitrilotriacetic acid, for example the trisodium salt, can be prepared batchwise by condensation of ammonia with alkali metal cyanides and formaldehyde with simultaneous alkaline hydrolysis of the nitrile groups. For this purpose aqueous alkaline solution is united with an alkali metal cyanide or a stoichiometric amount of alkali metal hydroxide and hydrocyanic acid and then formaldehyde is metered in slowly. Besides nitrilotriacetic acid there are formed, depending on the reaction conditions such as temperature, pressure, concentration, pH value and rate of metering, the incompletely carboxymethylated byproducts: iminodiacetic acid and aminoacetic acid, as well as other byproducts, for example hexamethylenetetramine, glycolic acid and formic acid.

This batchwise process has many disadvantages. Batchwise operation involves constant control of the apparatus during the whole of the reaction, lasting many hours, in order to adapt heat supply or cooling and simultaneous metering in of the starting material to the constantly changing course of the reaction.

The quality of the product is subject to great fluctuations, particularly the content of the desired reaction product in the reaction solution, the cyanide content, the formaldehyde content, the content of byproducts and secondary products and the color of the solutions.

The reaction of ammonia, cyanide and formaldehyde to salts of nitrilotriacetic acid is in fact a complicated system in which several side reactions and secondary reactions take place, for example hydrolysis of the cyanohydrin formed from sodium cyanide and formaldehyde into glycolic acid and the reaction of the ammonia formed in the hydrolysis of the nitrile to give incompletely carboxy-methylated aminoacids. Since when complicated reactions involving secondary reactions are carried out continuously, higher proportions of byproducts are generally obtained, there would have seemed to be little probability of an improvement in product quality being achieved by continuous operation.

It has already been proposed in our copending application, Ser. No. 743,221, filed July 8, 1968 now U.S. Pat. No. 3,607,930 that alkali metal salts of nitrilotriacetic acid should be prepared continuously from an alkali metal cyanide, formaldehyde and ammonia by carrying out the reaction in at least two stages, an alkali metal cyanide being reacted with formaldehyde in stoichiometric or substantially stoichiometric ratio at temperatures of from 50° to 200° C and pressures of about 2 to 50 atmospheres gauge in the presence of an excess of ammonia in the first stage to give a solution containing mainly aminoacetic acid, depressurizing the resultant solution to atmospheric pressure and then in one or more subsequent stages (while simultaneously removing ammonia) treating it with further amounts of alkali metal cyanide and formaldehyde at temperatures of 60° to 110° C to convert the aminoacetic acid into nitrilotriacetic acid.

We have now found that particularly good results are achieved in the said method when 5 to 35 mole percent, preferably 10 to 25 mole percent, of the total alkali metal cyanide required is replaced by free hydrocyanid acid and/or hydroxyacetonitrile. Unlike the prior art method the new process can be successfully carried out at atmospheric pressure. It is preferred, however, to use a pressure of 2 to 50 atmospheres gauge.

The reaction is advantageously carried out in at least two, preferably three, separate reaction vessels.

The reaction vessel used for the first stage may be for example an autoclave with only slight backmixing, preferably a coiled tube. The components formaldehyde, alkali metal cyanide and hydrocyanic acid are continuously metered into this vessel in stoichiometric or substantially stoichiometric amounts and an excess of ammonia (for example 1 to 10 moles of ammonia for each mole of sodium cyanide) may be added under a pressure of less than or equal to the saturation pressure. The reaction pressure in the first stage is 0 to 50 atmospheres gauge, advantageously 6 to 25 atmospheres gauge. A temperature in the range of from 50° to 200° C, preferably 100° to 130° C, is suitable as the reaction temperatures and the mean residence time is as a rule 10 minutes to 4 hours, preferably 20 minutes to 2 hours.

The formaldehyde is advantageously used in commercial 20 to 40 percent aqueous solution, and as the alkali metal cyanide it is suitable to use potassium cyanide or, because of its lower cost, advantageously sodium cyanide. The alkali metal cyanide may be added in solid form. For easier metering in however it is advisable to use an aqueous solution of an alkali metal cyanide. It is also possible to use commercial alkali metal cyanide solutions having a slight excess of alkali. The excess of alkali in such a solution is not detrimental, although it is not necessary as in the prior art batch method. More free hydrocyanic acid should however be used according to the excess of alkali.

When the reaction solution leaves the reaction vessel of the first stage, the pressure (if superatmospheric pressure has been used) is released to atmospheric pressure and the ammonia returned after it has been compressed. The reaction solution is then kept at temperatures of 60° to 110° C, preferably 75° to 95° C, in one or more than one further reaction vessel while adding more formaldehyde, alkali metal cyanide and hydrocyanic acid and removing ammonia contained in solution or freshly formed, for example by passing in nitrogen or steam. Reaction at atmospheric pressure may be carried out in one reaction vessel or preferably in a plurality, particularly two, separate vessels. For example, following the first stage, a stirred vessel may be used into which nitrogen is blown and formaldehyde and alkali metal cyanide (separately or mixed) are metered in at a rate depending on the degree of reaction achieved in the first stage, i.e. the content of monosubstitution and disubstitution products. As a rule the amount of formaldehyde and alkali metal cyanide to be added in the second stage is from 20 to 66 percent of the total amount required, the mean residence time being for example 2 to 10 hours.

Since when carrying out the reaction at atmospheric pressure in a stirred vessel the conversion to nitrilotriacetic acid is not complete, it has proved to be advantageous to continue the reaction in an additional vessel, for example a packed column or a bubble tray column in which steam flows countercurrent to the reaction solution to expel residual ammonia and to which a small amount, for example 2 to 10 percent, of the total amount of formaldehyde, alkali metal cyanide and hydrocyanic acid to be added is supplied for complete conversion of intermediate products still present into nitrilotriacetic acid. In this last reaction stage part of the alkali metal cyanide may be replaced by hydrocyanic acid, or formaldehyde and alkali metal cyanide alone may be added in stoichiometric or substantially stoichiometric amounts. In this column also the reaction temperature as a rule is from 60° to 110° C at mean residence times of for example 3 to 30 minutes.

A variant of the process consists in using an equimolar amount of hydroxyacetonitrile instead of free hydrocyanic acid, the amount of formaldehyde required being correspondingly less because hydroxyacetonitrile forms from hydrocyanic acid and formaldehyde.

The stages following the first stage may also be carried out in one apparatus when a column having a high retention volume, for example a bubble-tray column to which formaldehyde and alkali metal cyanide can be supplied at one place or at more than one place is used. When the first stage is carried out at atmospheric pressure, it is advantageous to carry out the reaction is a cascade of stirred vessels, such as is described in Example 1 for a specific case.

The process according to this invention yields a product having good and consistent quality which can be used for industrial purposes without purification or aftertreatment. The yields in this continuous process are considerably higher than those in conventional batch methods. In particular it is possible to convert the intermediates almost completely into the desired end product. The particular advantages of the process according to this invention are (a) the high space-time yields and (b) the high purity of the product. When apparatus having the same capacity is used, the output in the new process rises more than threefold. The alkali metal salt of nitrilotriacetic acid can be obtained from the aqueous solution by evaporation or spray drying in the form of the monohydrate in great purity and as a powder having a high complex-forming capacity.

The invention is illustrated by the following Examples. The parts and percentages given are by weight.

EXAMPLE 1

Referring to the apparatus diagrammatically shown in FIG. 1 of the accompanying drawings, 20 parts of 25 percent ammonia solution is placed in the first stirred vessel 1 of a two-stage cascade of stirred vessels (1,2) and in each hour 157.5 parts of a 28 percent sodium cyanide solution (I), 75 parts of a 36 percent formaldehyde solution (II) and 13 parts of a 44 percent hydroxyacetonitrile solution (III) are metered in. 2.7 parts of hydrogen cyanide in pure form or in aqueous solution and 8.3 parts of 36 percent formaldehyde solution may be used instead of the hydroxyacetonitrile solution). The reaction mixture runs from vessel 1 into a second vessel 2 through an immersed overflow pipe 3 which serves at the same time as a seal between the gas spaces of vessels 1 and 2. The temperature in vessel 1 is 85° C and in vessel 2 it is 95° C. Atmospheric pressure prevails in both vessels. The residence time is 12 hours in each vessel.

About 27 parts of ammonia (IV) escapes per hour through reflux condenser 4 and about 3 parts of ammonia through reflux condenser 5. The reaction mixture withdrawn from vessel 2 is continuously supplied to the top of a bubble-tray column having 10 trays and is substantially freed from ammonia with steam (V). Another 8.7 parts of sodium cyanide solution (I) and 4.2 parts of formaldehyde solution (II) are fed to the seventh tray of the column. About 217 'parts per hour of product solution (VI) follows away from column 6 at the bottom. If the product solution is evaporated to dryness, 92 parts of powder having 2 percent of moisture is obtained per hour. Each 100 parts of this powder has a complex-forming capacity of 13.7 parts of calcium, 8.3 parts of magnesium or 19.1 parts of iron.

COMPARATIVE EXPERIMENT

The procedure of the preceding Example is followed but 175 parts of a 28 percent sodium cyanide solution (I) and 83 parts of a 36 percent formaldehyde solution (II) are metered in per hour into the first stirred vessel 1. About 245 parts per hour of product solution (IV) flows out from the bottom of the column 6. When the product solution is evaporated to dryness, 99 parts of powder having 2 percent of moisture is obtained per hour. Each 100 parts of this powder has a complex-forming capacity of only 12.2 parts of a calcium, 6.4 parts of magnesium or 17.0 parts of iron.

EXAMPLE 2

157.5 parts of a sodium cyanide solution (I), 75 parts of a 36 percent formaldehyde solution (II), 13 parts of a 44 percent hydroxyacetonitrile solution (III) and 30 parts of ammonia are metered in per hour into a heated tubular reactor 7 in an apparatus as shown diagrammatically in FIG. 2 of the drawings. The temperature in the tubular reactor is 100° C, the pressure is 20 atmospheres gauge and the mean residence time is 30 minutes. The reaction mixture is run off continuously through a pressure release valve 8 into a stirred vessel 9 which is at atmospheric pressure. Another 78.8 parts of the sodium cyanide solution (I), 37.5 parts of the formaldehyde solution (II) and 6.5 parts of the hydroxyacetonitrile solution (III) are metered in per hour into this stirred vessel. The temperature in the vessel 9 is 85° C, the mean residence time is six hours. About 50 parts of ammonia per hour escapes through the reflux condenser 4. The reaction mixture withdrawn from the vessel 9 is continuously fed to the top of a bubble-tray column 6 having ten trays and substantially freed from ammonia with steam (IV). Another 11.8 parts of sodium cyanide solution (I), 5.6 parts of formaldehyde solution (II) and 0.97 part of hydroxyacetonitrile solution (III) per hour are fed onto the seventh tray of the column. About 270 parts of product solution (V) flows hourly from the column 6 at the bottom. If the product solution is evaporated to dryness, 139 parts of powder having 2 percent of moisture is obtained per hour. Each 100 parts of this powder has a complex-forming capacity of 15 parts of calcium, 9.1 parts of magnesium or 20.9 parts of iron.

COMPARATIVE EXPERIMENT

The procedure of Example 2 is followed, but the following amounts (in parts) are introduced per hour:

|  | Tubular reactor 7 | Vessel 9 | Column 6 |
| --- | --- | --- | --- |
| sodium cyanide solution (I) | 175 | 87.5 | 13.1 |
| formaldehyde solution (II) | 83.4 | 41.7 | 6.2 |
| ammonia | 30 | – | – |

Reaction product: about 362 parts (solution). If the product solution is evaporated to dryness, 139 parts of powder having 2 percent of moisture is obtained. Each 100 parts of this powder has a complex forming capacity of only 14.2 parts of calcium, 8.6 parts of magnesium or 19.8 parts of iron.

We claim:

1. A continuous process for the production of an alkali metal salt of nitrilotriacetic acid from alkali metal cyanide, formaldehyde and ammonia in at least two stages, which process comprises:

continuously introducing into a first stage reaction zone an alkali metal cyanide together with aqueous formaldehyde in a substantially stoichiometric ratio for reaction at a temperature of from 50° to 200° C. and a pressure of from atmospheric pressure to 50 atmospheres gauge in the presence of excess ammonia to form a solution which mainly contains aminoacetic acid, and then continuously conducting said solution from said first stage through at least one additional stage while simultaneously removing ammonia at a temperature of from 60° C. to 110° C. under atmospheric pressure and also supplying further amounts of alkali metal cyanide and formaldehyde for conversion of said aminoacetic acid into nitriloacetic acid, replacing from 5 to 35 mole percent of the total amount of alkali metal cyanide required in all stages by free hydrocyanic acid, hydroxyacetonitrile or mixtures thereof; and continuously withdrawing a solution of said alkali metal salt of nitrilotriacetic acid from the last reaction stage.

2. A process as claimed in claim 1 wherein the amount of the hydrocyanic acid, hydroxyacetonitrile or mixtures thereof replacing the alkali metal cyanide is 10 to 25 mole percent.

3. A process as claimed in claim 1 wherein the pressure in said first stage is from 2 to 50 atmospheres gauge and the solution from said first stage is depressurized to atmospheric pressure for said at least one additional stage.

4. A process as claimed in claim 1 wherein all stages are operated at atmospheric pressure.

5. A process as claimed in claim 1 wherein free hydrocyanic acid is employed to partly replace the alkali metal cyanide.

6. A process as claimed in claim 1 wherein free hydroxyacetonitrile is employed to partly replace the alkali metal cyanide and also to replace an equimolar amount of the formaldehyde.

\* \* \* \* \*

PO-1050
(5/69)

UNITED STATES PATENT OFFICE
CERTIFICATE OF CORRECTION

Patent No. 3,668,246          Dated June 6, 1972

Inventor(s) Christoph Berding et al

It is certified that error appears in the above-identified patent and that said Letters Patent are hereby corrected as shown below:

First page, insert -- The portion of the term of this patent extending beyond September 21, 1988, has been disclaimed. --.

Column 3, line 41, "follows" should read -- flows --; line 54, "(IV)" should read -- (VI) --; line 58, "of a calcium" should read -- of calcium --.

Signed and sealed this 17th day of October 1972.

(SEAL)
Attest:

EDWARD M. FLETCHER, JR.          ROBERT GOTTSCHALK
Attesting Officer                Commissioner of Patents